US012709426B2

(12) United States Patent
Davenport et al.

(10) Patent No.: US 12,709,426 B2
(45) Date of Patent: Aug. 18, 2026

(54) METHOD AND APPARATUS FOR HANDLING AND PROCESSING OF MATERIAL AND DEVICES FOR FREEZE-DRYING

(71) Applicant: Millrock Technology, Inc., Kingston, NY (US)

(72) Inventors: Aric H. Davenport, Accord, NY (US); Taylor N. Thompson, Port Ewen, NY (US)

(73) Assignee: MILLROCK TECHNOLOGY, INC., Kingston, NY (US)

( * ) Notice: Subject to any disclaimer, the term of this patent is extended or adjusted under 35 U.S.C. 154(b) by 869 days.

(21) Appl. No.: 17/980,075

(22) Filed: Nov. 3, 2022

(65) Prior Publication Data

US 2023/0144596 A1 May 11, 2023

Related U.S. Application Data

(60) Provisional application No. 63/276,258, filed on Nov. 5, 2021.

(51) Int. Cl.

| | |
|---|---|
| ***F26B 5/06*** | (2006.01) |
| ***B65B 5/06*** | (2006.01) |
| ***B65B 7/28*** | (2006.01) |
| ***B65B 31/02*** | (2006.01) |
| ***B65D 81/20*** | (2006.01) |
| ***F26B 25/16*** | (2006.01) |

(52) U.S. Cl.

CPC .............. *B65B 31/028* (2013.01); *B65B 5/06* (2013.01); *B65B 7/2842* (2013.01); *B65D 81/2015* (2013.01); *F26B 25/16* (2013.01); *F26B 5/06* (2013.01)

(58) Field of Classification Search

CPC ....... B65B 31/028; B65B 5/06; B65B 7/2824; B65D 81/2015; B65D 51/241; F26B 5/06

USPC .............................................................. 34/28

See application file for complete search history.

(56) References Cited

U.S. PATENT DOCUMENTS 3,454,178 A 7/1969 Bender
3,488,860 A 1/1970 Bender
3,537,189 A 11/1970 Bender
(Continued)

FOREIGN PATENT DOCUMENTS

CN 213873452 U 8/2021
DE 3500026 A1 7/1986
(Continued)

OTHER PUBLICATIONS

International Preliminary Report on Patentability dated Feb. 23, 2024 for PCT/US2022/048934, 20 pages.
(Continued)

*Primary Examiner* — Deming Wan

(74) *Attorney, Agent, or Firm* — Nixon & Vanderhye PC

(57) ABSTRACT

The present technology is directed to an apparatus for freeze-drying various items. The apparatus described herein includes a reusable sealable container enabling aseptic handling of bulk processed materials. The multi-use tray enables a sterile sealable enclosure for use throughout the freeze-drying process, including: pre-freeze-drying (e.g., filling, handling, storage, transfer), freeze-drying processing, and/or post-freeze-drying (e.g., handling and storage).

18 Claims, 4 Drawing Sheets

(56) References Cited

U.S. PATENT DOCUMENTS

| | | | | |
|---|---|---|---|---|
| 3,545,097 | A | 12/1970 | Waltrich | |
| 4,084,330 | A | 4/1978 | Fraser | |
| 4,105,407 | A | 8/1978 | Sanderson | |
| 4,445,550 | A | 5/1984 | Davis | |
| 4,588,662 | A | 5/1986 | McManis | |
| 4,609,102 | A | 9/1986 | Blum | |
| 4,713,925 | A * | 12/1987 | Kafkis | B65B 31/02 141/31 |
| 4,973,327 | A | 11/1990 | Goodrich | |
| 5,065,908 | A | 11/1991 | Mengeu | |
| 5,090,132 | A | 2/1992 | Kobayashi | |
| 5,201,924 | A | 4/1993 | Mix | |
| 5,257,983 | A | 11/1993 | Garyantes | |
| 5,309,649 | A | 5/1994 | Bergmann | |
| 5,522,155 | A | 6/1996 | Jones | |
| 5,732,837 | A | 3/1998 | Jones | |
| 5,819,964 | A | 10/1998 | Grimard | |
| D425,205 | S | 5/2000 | Henigan | |
| D430,939 | S | 9/2000 | Zukor | |
| 6,199,297 | B1 | 3/2001 | Wisniewski | |
| 6,517,526 | B1 | 2/2003 | Tamari | |
| 6,530,145 | B1 | 3/2003 | Beigay | |
| 6,566,144 | B1 | 5/2003 | Madril | |
| 6,610,252 | B2 | 8/2003 | Madril | |
| 6,773,425 | B1 | 8/2004 | Tamari | |
| 7,520,670 | B2 | 4/2009 | Schwegman | |
| 7,966,746 | B2 | 6/2011 | Py | |
| 9,121,637 | B2 | 9/2015 | Ling | |
| 9,278,790 | B2 | 3/2016 | McPherson | |
| 2001/0001348 | A1 | 5/2001 | Wisniewski | |
| 2009/0107001 | A1 * | 4/2009 | McCarthy | A61P 7/08 34/92 |
| 2010/0049156 | A1 | 2/2010 | Dickhorner | |
| 2010/0124563 | A1 * | 5/2010 | Coleman | A61L 27/56 435/307.1 |
| 2010/0200588 | A1 | 8/2010 | Bergman | |
| 2012/0152957 | A1 | 6/2012 | Smith | |
| 2015/0353248 | A1 | 12/2015 | McPherson | |
| 2018/0209731 | A1 | 7/2018 | Knight | |
| 2021/0236384 | A1 | 8/2021 | Watson | |
| 2021/0316918 | A1 | 10/2021 | Mueller et al. | |

FOREIGN PATENT DOCUMENTS

| | | | | |
|---|---|---|---|---|
| JP | H07-41395 U | 7/1995 | | |
| WO | 96/31748 | 10/1996 | | |
| WO | WO-2007106676 A2 * | 9/2007 | | B65D 81/2038 |
| WO | 2020/185909 | 9/2020 | | |

OTHER PUBLICATIONS

Cherry, Cooper, Millward—Proof of Concept: Containment Systems, Drying Technology, vol. 33, No. 4, pp. 466, 2015, doi: 10.

Chamberlain, Schauersback—Freeze-Drying in Protective Bags, European Journal of Pharmaceutics, Mar. 2020, doi 10.

PCT International Search Report and Written Opinion of the International Searching Authority for Application PCT/US22/48934 dated Mar. 17, 2023, 16 pages.

Extended European Search Report dated Jan. 15, 2026 in European Application No. 22890811.7, 11 pages.

* cited by examiner

METHOD AND APPARATUS FOR HANDLING AND PROCESSING OF MATERIAL AND DEVICES FOR FREEZE-DRYING

CROSS REFERENCE TO RELATED APPLICATION(S)

This application claims priority to U.S. Patent Application No. 63/276,258, filed Nov. 5, 2021, the entire contents of which are incorporated herein by reference.

BACKGROUND

Various technologies exist for freeze drying certain items, including items that require a sterile environment. An open tray (or container) freeze drying method exists for freeze-drying applications not using vials (i.e., for holding and processing the product to be dried). Processing materials in freeze drying applications using open trays or containers can be fraught with issues including, but not limited to: spillage of materials or product during filling and transfer, exposure of the operator to the product or materials, exposure of the materials to unfavorable conditions potentially compromising the product, potential cross contamination between batches, potential compromised sterility and product contamination including particles and foreign matter, fly-out of material inside the freeze-dryer which reduces yields, requires cleaning, and enables cross-contamination, and/or a need to remove and transfer the material to another container for storage.

Some products or materials may degrade in the presence of oxygen, thus reducing the efficacy, potency, and usefulness of the material. These materials must therefore be filled, stored, and transferred in environmental controlled rooms, such as anerobic rooms, and the operators need to be gowned in protective clothing and apparatus. The technology described herein can eliminate the need for an entire controlled room and reduce loading (e.g., of products or materials) to a simple hood or isolator, as one non-limiting example. A few examples of products that are freeze-dried in a manner that would benefit from this method and apparatus include liquids, powders, frozen spheres, collogen, scaffolds, tissue, diagnostic kits, reagents, microbiome material, probiotics, etc.

Many freeze-drying applications require a large amount of liquid to be processed. When adding liquid to the trays/containers remotely, transfer of the liquid filled tray is difficult without spillage and exposes the operator to the material while exposing the liquid to the environment. The current common practice is to fill open freeze-drying trays or containers with a liquid remotely from the freeze-dryer and then the liquid filled trays are transferred by hand or cart to the freeze-dryer where the trays/containers are placed into the freeze-dryer.

To eliminate the difficulties of transferring open trays filled with liquid, the trays can be filled after being placed on the freeze-dryer shelf. To do so, the empty tray is partially slid off the front of the shelf and liquid is poured in. It is difficult to add the liquid due to minimal spacing between the freeze dryer shelves, filling the trays at different heights (shelves are located at different heights), and the need to balance the tray while adding the liquid. The operator is still exposed to the product and the product is still exposed to the environment.

Open trays also expose the product to the potential for particulate cross-contamination while inside the freeze-dryer. To eliminate this issue the freeze-dryer needs to be equipped with clean-in-place capability and sometimes steam sterilization. Both solutions add significant complexity to the equipment and significant cost.

After freeze-drying, when removing the trays/containers, the material often needs to be quickly removed and placed in other containers for storage to prevent rehydration, contamination, and exposure to the environment and to the operator. Transferring the material to another container adds more potential for loss of material and contamination and operator exposure. Some products degrade in the presence of oxygen. To overcome the issue of exposure to oxygen, the product needs to be processed in an anerobic isolator that is attached to the freeze-dryer. This solution adds significant complexity and cost.

Certain commercial products exist that allow for freeze drying using trays. One example freeze-drying tray includes a single-use bulk lyophilization container. These single-use, disposable trays minimize product ejection to reduce operator exposure to active pharmaceutical ingredient(s) (API) and eliminate tray cleaning and validation costs. Such trays are fully enclosed, single-use, disposable containers that use expanded polytetrafluoroethylene (ePTFE) membrane technology to contain and protect liquid or lyophilized API during the entire freeze-drying process.

These trays offers a solution for liquid material bulk freeze-drying applications. In particular, the tray offers a container with a membrane to enable freeze-drying processing. However, the tray cannot be sealed from the environment and cannot be used for many bulk applications including devices, scaffolds, tissues, etc. The limits and drawbacks of these trays include, but are not limited to: no ability to seal the product from the environment (e.g., the container cannot be hermetically sealed), potential spillage through the membrane, difficultly of filling through a limited size port, limited to liquid products, single use (i.e., high cost of the container per batch, not environmentally friendly), potential particulate contamination of the product when the membrane is pierced to remove the product from the container, the container cannot be used for devices or products that require mechanical support, no visibility of the product, and/or fill port adds to the height of the tray, thus requiring more shelf spacing.

Another brand of freeze-drying technology exists that offers solutions for bulk processing consisting of trays or containers with filter membranes. Such trays for sterile freeze-drying are available in two materials: aluminum and stainless steel. All components of the trays, including the membrane, can be sterilized in an autoclave. APIs can be produced aseptically in compliance with GMP. The trays in stainless steel are customizable in size and can be adjusted to the dimensions of individual freeze-dryer shelves. The trays can also be equipped with fillers and mounts for temperature sensors.

While these trays offers various advantages, some of the drawbacks of such trays include, but are not limited to: no ability to fully seal the product from the environment (e.g., containers are not hermetically sealable), potential spillage through the membrane, reduces but does not eliminate dust exposure, reduces but does not eliminate occupational exposure, inconvenient method of attaching membrane to the tray, no method for sealing and storing pre-freeze-drying, requires a controlled environment throughout the filling, loading, and unloading process, and/or requires transfer to another container for long-term storage post-freeze-drying. Thus, it should be appreciated that new and useful solutions are continually sought after.

BRIEF DESCRIPTION OF THE DRAWINGS

The detailed description is set forth with reference to the accompanying figures.

DETAILED DESCRIPTION OF EXAMPLE NON-LIMITING EMBODIMENTS OF THE TECHNOLOGY

Figure 1:
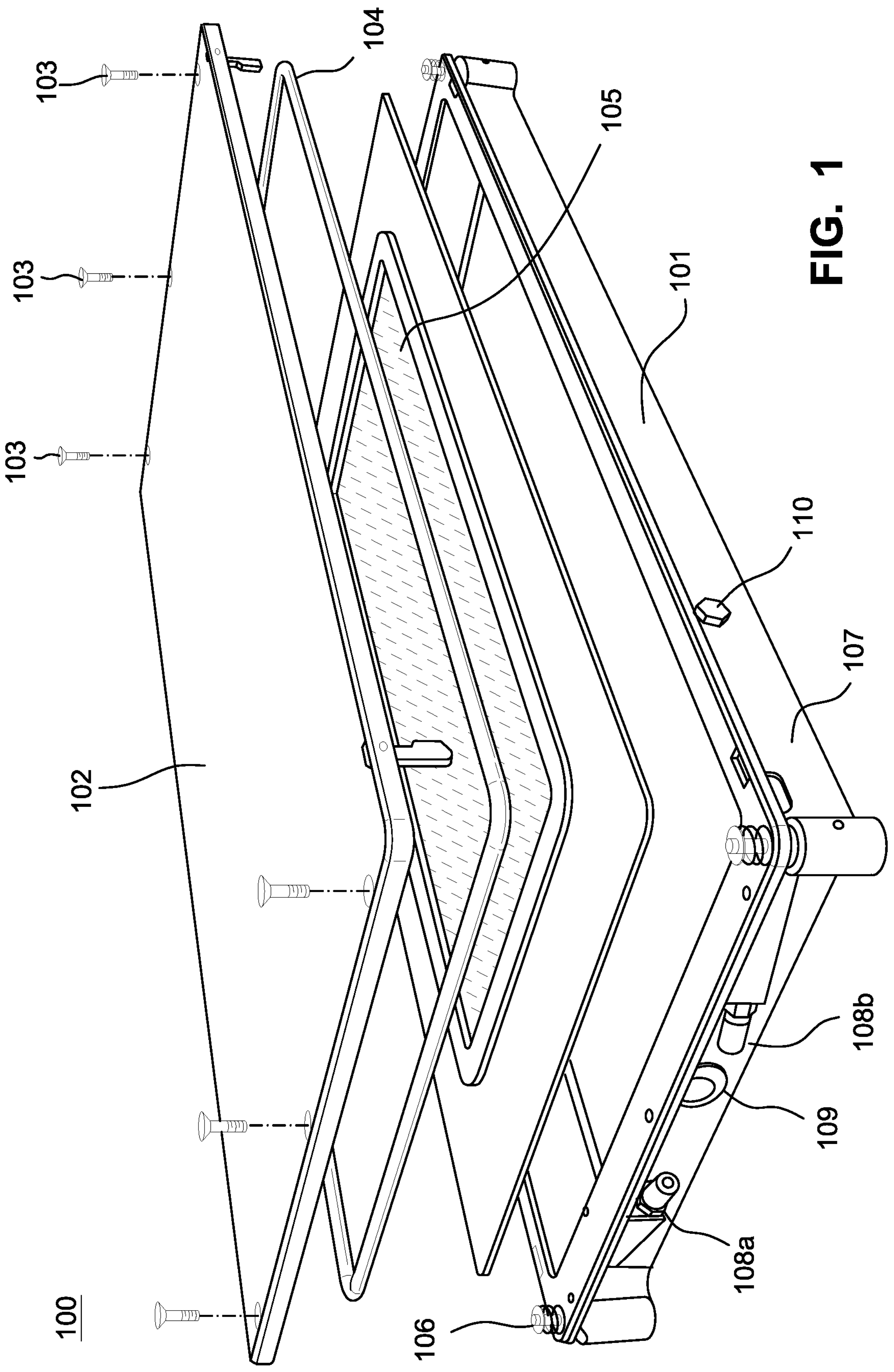
FIG. 1 shows an example tray assembly 100 for use in a freeze-drying process.

The technology described herein is directed to a freeze-drying method, apparatus, and system that improves upon drawbacks of the conventional technology. In particular, a novel apparatus and method is described that overcomes the issues of open trays and other existing products and processes offered to the market for bulk material freeze-drying. The apparatus described herein includes a reusable sealable container enabling aseptic handling of bulk processed materials. It should be appreciated that the sealable container can include hermetic sealing (e.g., airtight, watertight, vacuum sealable, etc.). The multi-use tray enables a sterile sealable enclosure for use throughout the freeze-drying process, including: pre-freeze-drying (e g, filling, handling, storage, transfer), freeze-drying processing, and/or post-freeze-drying (e g, handling and storage).

The technology described herein relates to a method and apparatus that enables liquids, powders, devices, and other materials that are to be freeze-dried to be filled or loaded into a reusable, sealable container for handling and storage. The container can be filled or loaded in an aseptic hood or isolator or in an aseptic environment. After filling or loading, the container is sealed and can be handled and stored in a fashion to keep the product from being contaminated and/or from oxygen/air which may degrade the material and eliminates exposure to the operator.

The container can then be stored until ready for freeze-drying. The container can then be transferred to the freeze-dryer where the seal can be either manually opened prior to processing in a clean or aseptic environment; or automatically opened inside the freeze-dryer, using either differential of pressure or by mechanical means (or both).

At the end of the freeze-drying process, while still inside the freeze-dryer, the container can be sealed under low pressure and with an inert gas. The container lid can be closed and sealed using the freeze-dryer stoppering system (e.g., while there is a slight negative pressure in the product chamber). Sealing can take place after the product chamber is backfilled with inert gas. As the freeze-dryer product chamber vacuum is released, the vacuum inside the container holds the lid in place. For additional safety, a mechanical means of holding the lid in place, such as a 'push-to-close' latch may be used.

The sealed tray can have slight negative pressure with either air or inert gas or can be sealed at atmospheric pressure if mechanical means is supplied. After the containers are sealed, the freeze-dryer product chamber is opened, and the trays are removed. The trays are sealed thereby maintaining an aseptic and particle free environment and eliminating operator exposure to the product.

The container design and method of use enables long term storage before and after freeze drying, particulate free freeze-drying when a filter is included, and prevents operator exposure to the product. To add a level of safety, mechanical fasteners can be installed by the operator to ensure seal integrity for even longer storage durations. The containers are cleanable and reusable and can be designed to be sterilizable between uses.

For further protection a filter membrane may be included between the lid and container to enable freeze-drying without loss of product particulates. This novel design eliminates the need for the entire room to be environmentally controlled. For filling, a hood or small isolator can be used. For loading into the freeze-dryer, the container remains sealed and therefore no special environmental control or clean room is required.

Handling, storing, and processing liquids, powders, devices, and other configurations and materials to be freeze-dried include, but are not limited to: Polypeptides, Oligonucleotides, APIs, highly potent and dangerous to exposure materials, microbiome materials, collagen and scaffold materials, diagnostic kits and reagents, medical devices, any materials that require aseptic handling, any product or material that needs to be contained in a controlled atmosphere post-freeze-drying, any product or material where the operator needs to be protected from exposure, such as cytotoxic materials, and/or any products or materials that may require long term storage prior to freeze-drying.

The described apparatus enables bulk products and devices to be loaded and sealed thereby protecting the materials inside from contaminates and other undesirable factors such as oxygen rich environments, with or without the use of a filter. The container and components may be made from sterilizable materials and sterilized using conventional and accepted methods such as an autoclave, vaporized hydrogen peroxide, or other methods. Reusable, sterilizable, sealable containers dramatically improve the process and eliminates the need for large clean room or processing environments and simplifies the design of the freeze-dryer by eliminating the need for sterilization of the freeze-dryer.

The technology described herein offers various features and advantages including, but not limited to: ability to seal the tray outside of the freeze-dryer (e.g., by vacuum, pressure differential; by mechanical means that include (but are not limited to) fasteners, push to close/open latches, clamps, and/or other means), storage and transfer of liquid and powder material in a sealable container (e.g., hermetic sealing, either mechanically or by vacuum or both, enables long-term storage for process sensitive products), protect the product from contamination or exposure to unfavorable conditions (e.g., the product can be placed in the tray in a clean environment and sealed until the tray is either moved to another clean environment or after it is placed in the freeze dryer where it can be automatically opened), protect the operator from exposure to the product by filing in an isolated hood and then sealing for transfer, and/or eliminate cross contamination inside the freeze-dryer by only opening when the system is under vacuum.

Certain advantages of the container include, but are not limited to: container can be made in varying sizes and shapes to accommodate a range of materials and products, such as tissue, diagnostic kits, medical devices, etc., container is cleanable and reusable, container can be made with sterilizable materials, container includes one or more ports with valves for vacuum and liquid fill, container contains a method for visually verifying vacuum seal integrity, and/or container lid can be made to provide visibility to the product (e.g., transparent materials, metal or plastic with sight glass).

The technology allows an inert hydrophobic membrane, such as ePTFE membranes, to be added between the lid and tray to further reduce issues with cross contamination and particulate loss during the freeze-drying process (the filter can either be a large surface area membrane that covers the entire tray, or a perimeter membrane placed on the perimeter mounted in the gap between the lid and the tray). Moreover, a vacuum release mechanism can be provided for quickly releasing vacuum, and a backup vacuum release port can be included should the master vacuum release mechanism fail.

FIG. 1 shows an example tray assembly 100 for use in a freeze-drying process. The system (including tray assembly 100) is designed for filling or loading of product, sealing for contamination prevention and operator protection, handling and transfer to/from the freeze-drying, and/or long term storage before and after the freeze-drying process. The system is also configured to freeze-dry the product which includes low pressures and low temperatures as well as high temperatures, and the system has the ability to be reused, cleaned and sterilized.

The tray assembly 100 can include various components for performing certain freeze-drying processes described herein. For example, tray assembly 100 can include a tray (or container) 101 for holding various items. In one example, tray 101 can be made in any shape or size, and can be made from either metal or plastic that can hold a material or device(s). The tray bottom can be in intimate contact with a freeze dryer shelf, and the tray 101 can be treated or coated with non-stick or other coatings as the application requires.

Tray assembly 100 can further include a lid 102 used to cover tray 101. In one example embodiment, the lid 102 can be made from either metal or plastic and can contain a view port for product visibility. The lid 102 can be designed to maintain a low-pressure seal and can be latched or fastened into place. Tray assembly 100 can further include fasteners 103 (e.g., for long term storage). Fasteners 103 can be used to maintain the lid seal when the tray system is in long term storage. Fasteners 103 can include mechanical means (e.g., screws) and can be removed prior to placing the tray system in the freeze-dryer. It should be appreciated that the lid may be made from any material including, but not limited to, metal, glass plastic, and any other solid or semi-solid material. In one example embodiment, the lid may be made from borosilicate glass.

Tray assembly 100 can also include a seal (or gasket) 104 for helping to seal the material contained in tray 101. Seal 104 can be made from pharmaceutical grade materials that can withstand the environmental conditions associated with freeze-drying. The seal 104 can be in the form of an o-ring, sheet material, molded or extruded material, inflatable, or any other method used for sealing between two surfaces.

Tray assembly 100 can further include a filter 105 used to filter out certain elements while keeping other elements in tray 101. For example, filter 105 can be used to minimize particle loss during the freeze-drying process. That is, filter 105 may be used to prevent a powder from escaping tray 101 during a freeze-drying process.

Tray assembly 100 can also include a lid lifting mechanism 106 for enabling the lid to lift from the tray thereby "opening" the tray assembly 100. Lid lifting mechanism 106 can include a mechanism that raises the lid and keeps it separated from the tray to enable filling and freeze-drying. This mechanism 106 enables the lid to be automatically raised for freeze-drying while inside the freeze-dryer when the pressure inside is greater than the pressure in the freeze-dryer product chamber.

Tray assembly 100 can further include a mechanical latch 107 for allowing lid 102 to latch to tray 101. Mechanical latch 107, in one non-limiting example, allows for a method for maintaining the lid seal without a vacuum for secondary protection of the product when being stored or transferred.

As discussed herein, tray assembly 100 can include items that may be placed in a vacuum (e.g., for freeze-drying) and thus tray assembly 100 includes several components for providing such a vacuum. For example, tray assembly 100 can include a vacuum (or liquid fill) ports (or valves) 108*a* and 108*b*. In one example embodiment, tray assembly may include only one vacuum port (e.g., vacuum port 108*a*), and can further include more than two vacuum ports. Vacuum (or fill) ports 108*a* and 108*b* can be provided on the tray 101 or lid 102 and can include a valve and/or check valve to enable liquid to be pumped or pulled into the tray, and a vacuum/gas backfill source can be attached to provide a method of sealing the lid with an inert gas atmosphere inside the container.

It should be appreciated that, in one non-limiting example, tray assembly 100 may include a vacuum port 108*a* and a fill port 108*b*. In particular, vacuum port 108*a* may be used to apply a vacuum to tray assembly 100 while fill port 108*b* may be used to fill an item (e.g., liquid) into tray 101. In such a configuration, vacuum port 108*a* may need to be positioned above a liquid in tray 101 where fill port 108*b* may be positioned below the liquid in tray 101.

Tray assembly 100 can further include vacuum indicator 109 and backup vacuum release 110. Vacuum indicator 109 can be used to indicate whether a vacuum exists inside tray assembly 100. For example, vacuum indicator 109 can include a "pop disk" vacuum indicator to allow the operator to visually verify that the container is vacuum sealed. When the tray assembly 100 is vacuum sealed, vacuum indicator 109 may be "popped closed" to indicate that the tray assembly 100 is under vacuum. Vacuum indicator 109 may be "popped open" when the vacuum is released. For example, an operator may use backup vacuum release 110 to release the vacuum from tray assembly 100. Backup vacuum release 110 can thus provide a method to release the vacuum that requires operator intervention (e.g., should the vacuum port valves fail). The vacuum can be released under any variety of methods, including release via the vacuum ports 108*a* and 108*b*.

These examples of tray assembly 100 shown in FIG. 1 are of course non-limiting and the technology described herein envisions any variety of modifications to achieve the described features. For example, tray assembly 100 can include an optional filter bag where the entire tray assembly 100 can be placed inside a bacteria-proof container with a vapor permeable membrane bag for storage and handling before being placed in the freeze-dryer (and for processing inside the freeze-dryer and for handling and storage after freeze-drying). Tray assembly 100 may further include an optional perimeter filter (as discussed with respect to FIG. 2).

It should be appreciated that tray assembly 100 may be used within a closure system (e.g., for storing and maintaining items in the tray assembly 100). In one example embodiment, the lid may be placed onto the tray assembly 100, and assembly 100 can be loaded into a closure system. The closure system may use mechanical stoppers to press the lid onto the tray assembly 100 and seal the assembly. Vacuum ports 108*a/b* can be used to generate a vacuum within the tray assembly 100 keeping the lid in place after the mechanical stoppers are removed.

The tray assembly 100, after sealing, can be stored/loaded into a freeze dryer, and the freeze dryer door can be closed and sealed under vacuum to initiate freeze drying. Once freezing is complete, the system can move to a primary drying phase where the pressure in the chamber drops below the pressure in the tray assembly 100, and the lid may open (e.g., for sublimation to occur). After primary (and/or secondary) drying is complete, the system can re-seal the tray assembly 100 using a stoppering mechanism by sealing the lid to the tray assembly 100. The vacuum in the chamber may be released and the tray assembly 100 will stay sealed. This example is of course non-limiting and the technology described herein envisions any variety of use for tray assembly 100.

Figure 2:
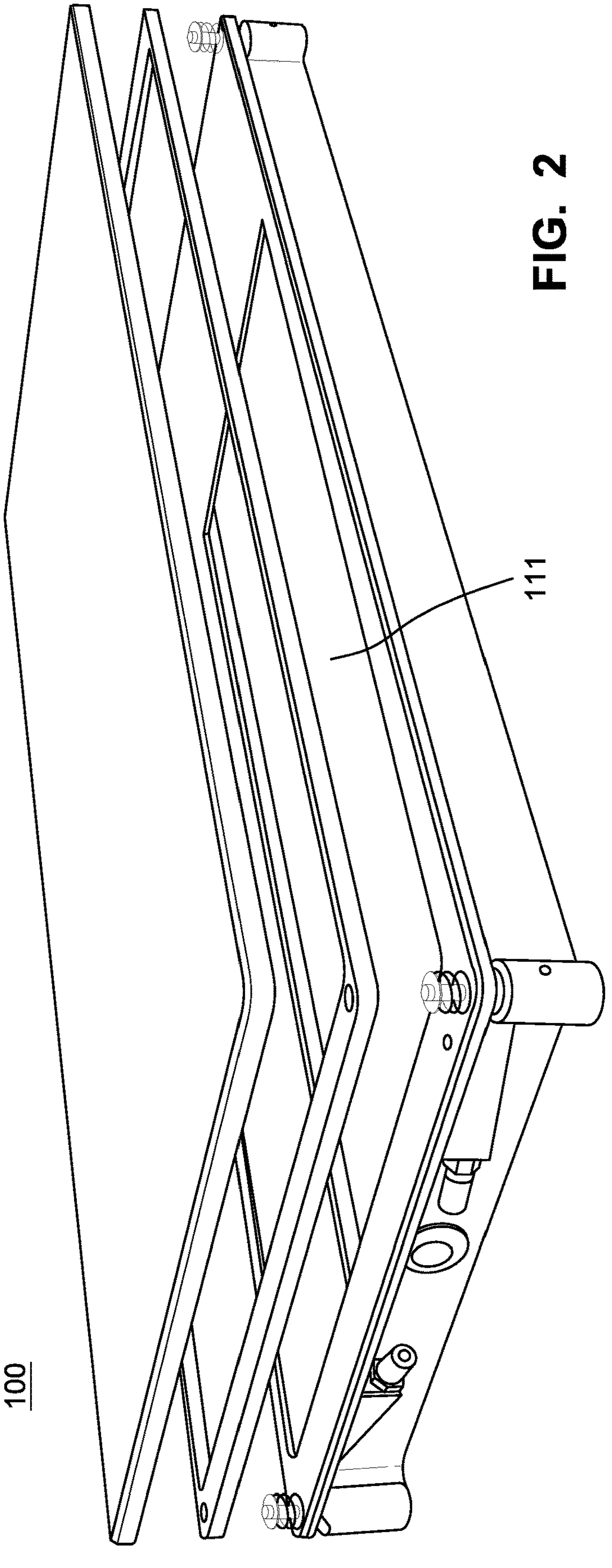
FIG. 2 shows a non-limiting example tray assembly 100.

FIG. 2 shows a non-limiting example tray assembly 100. The tray assembly 100 shown in FIG. 2 may include features substantially corresponding to tray assembly 100 in FIG. 1. Tray assembly 100 shown in FIG. 2 also includes a perimeter filter 111 used to prevent particulate loss (similar to filter 105 shown in FIG. 1). In one non-limiting example, tray assembly 100 may include an optional perimeter filter 111 that can be placed on the perimeter of the tray assembly 100 between the lid 102 and the tray 101 to prevent particulate loss during the freeze-drying process. For example, perimeter filter 111 may be used to prevent a powder from escaping tray 101 during a freeze-drying process. Another method that could be employed includes a filter cap that fits over lid 102 and attaches to tray 101 (e.g., covering the gap similar to a "hair net").

Figure 3:
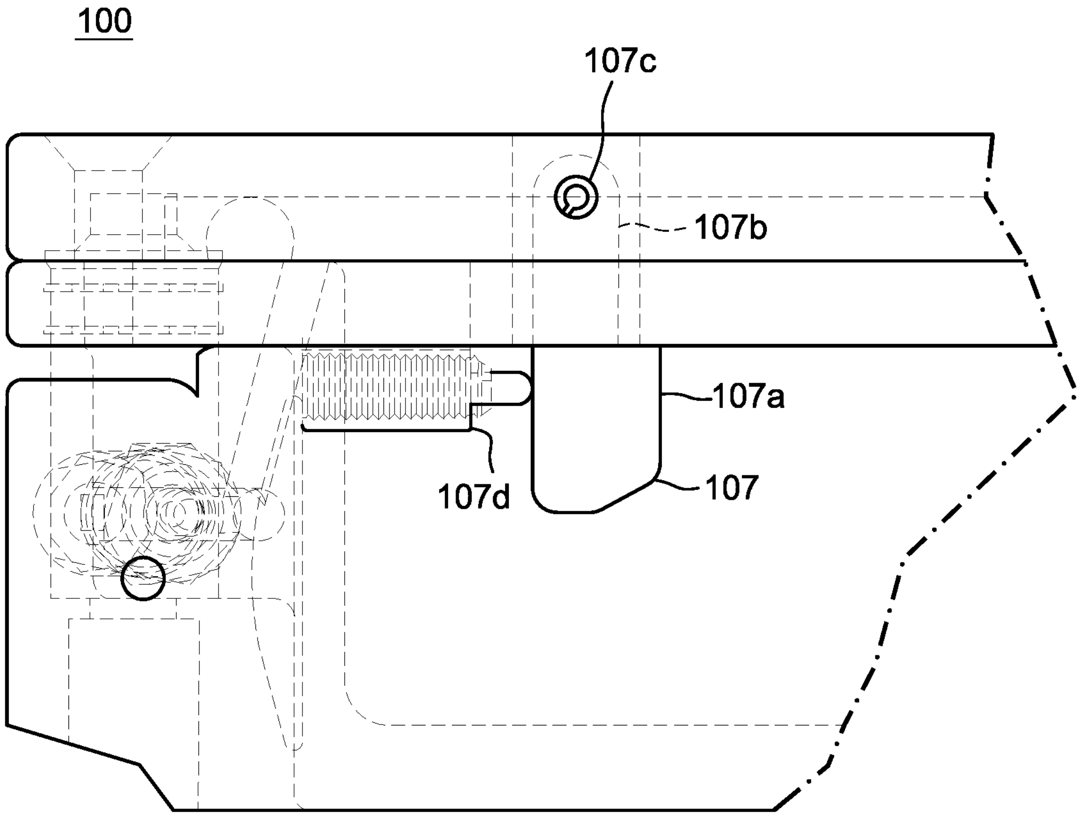
FIG. 3 shows a non-limiting example diagram of a partial side view of tray assembly 100.

FIG. 3 shows a non-limiting example diagram of a partial side view of tray assembly 100. FIG. 3 specifically depicts mechanical latch 107 of tray assembly 100 where mechanical latch 107 is in operation. In the example shown in FIG. 3, tray assembly 100 is in the "closed" position where lid 102 is in contact with (or substantially in contact with) tray 101, and any items held by tray 101 are no longer exposed to an outside environment.

As can be seen in FIG. 3, mechanical latch 107 has an oblong shape where a bottom portion 107*a* of latch 107 is slightly larger in width than a top portion 107*b* of latch 107. Latch 107 may also include a connection portion 107*c* that connects latch 107 to tray assembly 100. Connection portion 107*c* could include any device or material to connect latch 107 to tray assembly 100 that includes any type of fastener (e.g., screw) or adhesive. Connection portion 107*c* may enable latch 107 to change position in operation so latch 107 can "release" lid 102 from tray 101 to allow tray assembly 100 to be in an "open" configuration.

Latch 107 may be in operation with locking portion 107*d*. Locking portion may include a component to move locking portion 107*d* to/from a position making contact with latch 107. For example, locking portion 107*d* could include a spring allowing locking portion to move back and forth to release or secure latch 107. Locking portion 107*d* may further include a component that makes contact with latch 107 to secure latch 107 in place while tray assembly 100 is in a "closed" state. For example, locking portion 107*d* may include another latch portion to abut latch 107 and keep latch 107 secure while tray assembly 100 is in a "closed" state. These examples are of course non-limiting and the technology described herein envisions any variety of mechanisms for allowing tray assembly 100 to be in an "open" or "closed" state.

Figure 4:
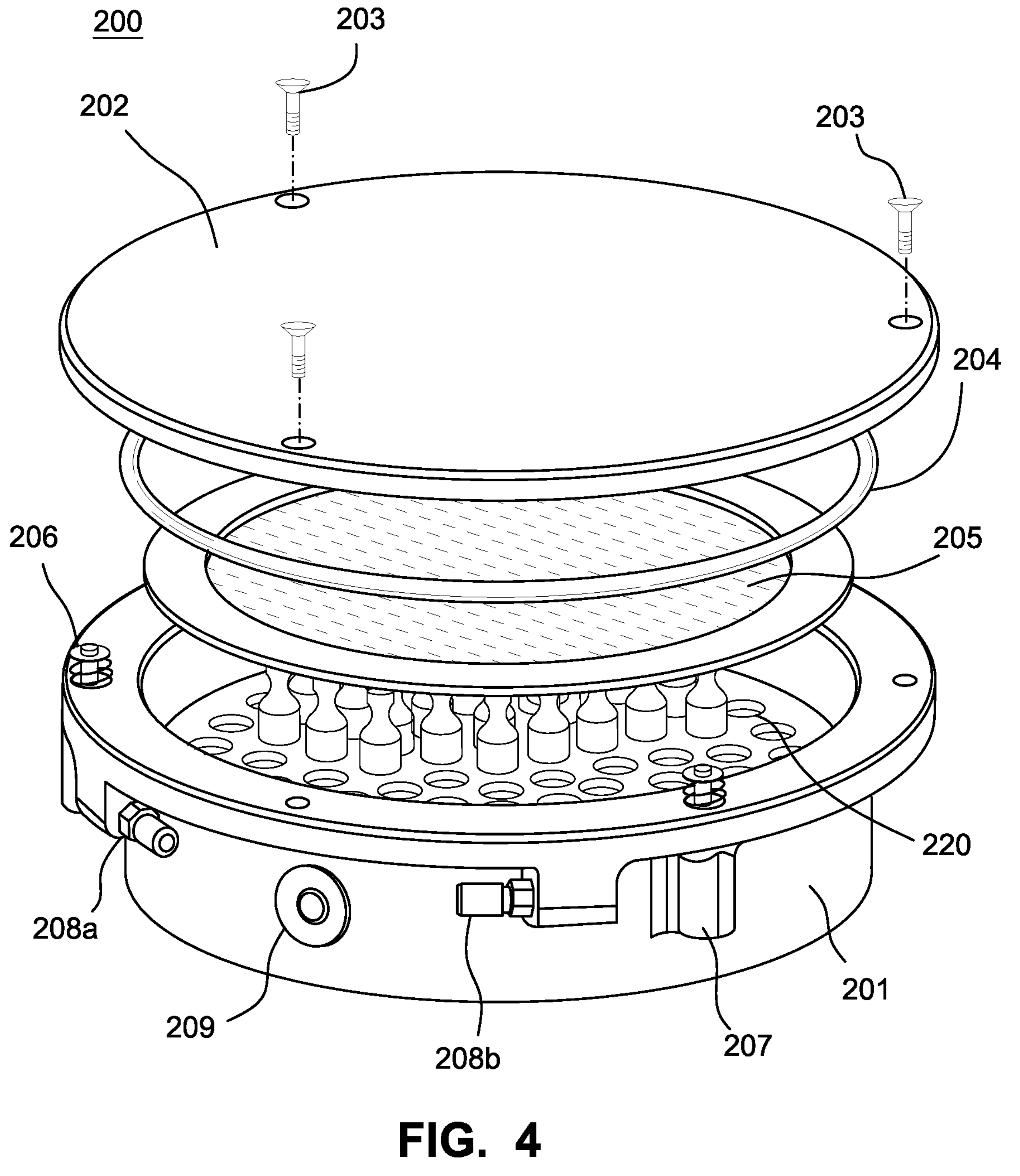
FIG. 4 shows a non-limiting example diagram of tray assembly 200.

FIG. 4 shows a non-limiting example diagram of tray assembly 200. In one non-limiting example, FIG. 4 shows an exploded view of an alternate tray assembly 200 (that includes a filter and device carrier). In the example shown in FIG. 4, tray assembly 200 contains several features similarly found with respect to tray assembly 100. Tray assembly 100 is shown with a substantially rectangular shape, where tray assembly 200 has a substantially circular configuration. Moreover, and as discussed herein, tray assembly 200 is shown with a device holder used to hold one or more device (e.g., vials). Tray assembly 200 is configured for filling or loading of product, sealing for contamination prevention and operator protection, handling and transfer to/from the freeze-drying, and/or long term storage before and after the freeze-drying process. Tray assembly 200 is also configured to freeze-dry the product which includes low pressures and low temperatures as well as high temperatures, and the system has the ability to be reused, cleaned and sterilized.

Tray assembly 200 can include a tray (or container) 201 for holding various items. Tray 201 can be made in any shape or size, and can be made from either metal or plastic that can hold a material or device(s). The tray bottom can be in intimate contact with a freeze dryer shelf, and the tray 201 can be treated or coated with non-stick or other coatings as the application requires.

Tray 201 can further include a device holder 220 to hold one or more devices in place. In one non-limiting example, device holder 220 can include various opening portions (e.g., holes) to allow a portion of device(s) to sit in and stay in place (e.g., as tray assembly 200 is transported). For example, device holder 220 is configured to have holes that accept one or more vials, or other liquid filled containers, to be positioned inside thereby keeping them secure in fixed locations of device holder 220 (e.g., so vials, or other similar containers, can be transported with tray assembly 200).

Tray assembly 200 can further include a lid 202 used to cover tray 201. In one example embodiment, the lid 202 can be made from either metal or plastic and can contain a view port for product visibility. The lid 202 can be designed to maintain a low-pressure seal and can be latched or fastened into place. Tray assembly 200 can further include fasteners 203 (e.g., for long term storage). Fasteners 203 can be used to maintain the lid seal when the tray system is in long term storage. Fasteners 203 can include mechanical means (e.g., screws) and can be removed prior to placing the tray system in the freeze-dryer.

Tray assembly 200 can also include a seal (or gasket) 204 for helping to seal the material contained in tray 201. Seal 204 can be made from pharmaceutical grade materials that can withstand the environmental conditions associated with freeze-drying. The seal 204 can be in the form of an o-ring, sheet material, molded or extruded material, inflatable, or any other method used for sealing between two surfaces.

Tray assembly 200 can further include a filter 205 used to filter out certain elements while keeping other elements in tray 201. For example, filter 205 can be used to minimize particle loss during the freeze-drying process. That is, filter 205 may be used to prevent a powder from escaping tray 201 during a freeze-drying process.

Tray assembly 200 can also include a lid lifting mechanism 206 for enabling the lid to lift from the tray thereby "opening" the tray assembly 200. Lid lifting mechanism 206 can include a mechanism that raises the lid and keeps it separated from the tray to enable filling and freeze-drying. This mechanism 206 enables the lid to be automatically raised for freeze-drying while inside the freeze-dryer when the pressure inside is greater than the pressure in the freeze-dryer product chamber.

Tray assembly 200 can further include a mechanical latch 207 for allowing lid 202 to latch to tray 201. Mechanical latch 207, in one non-limiting example, allows for a method for maintaining the lid seal without a vacuum for secondary protection of the product when being stored or transferred.

Tray assembly 200 can include items that may be placed in a vacuum (e.g., for freeze-drying) and thus tray assembly 200 includes several components for providing such a vacuum. For example, tray assembly 200 can include a vacuum (or liquid fill) ports (or valves) 208*a* and 208*b*. In one example embodiment, tray assembly may include only one vacuum port (e.g., vacuum port 208*a*), and can further include more than two vacuum ports. Vacuum (or fill) ports 208*a* and 208*b* can be provided on the tray 201 or lid 202 and can include a valve and/or check valve to enable liquid to be pumped or pulled into the tray, and a vacuum/gas backfill source can be attached to provide a method of sealing the lid with an inert gas atmosphere inside the container.

It should be appreciated that, in one non-limiting example, tray assembly 200 may include a vacuum port 208*a* and a fill port 208*b*. In particular, vacuum port 208*a* may be used to apply a vacuum to tray assembly 200 while fill port 208*b* may be used to fill an item (e.g., liquid) into tray 201. In such a configuration, vacuum port 208*a* may need to be positioned above a liquid in tray 201 where fill port 208*b* may be positioned below the liquid in tray 201.

Tray assembly 200 can further include vacuum indicator 209 and backup vacuum release (not shown). Vacuum indicator 209 can be used to indicate whether a vacuum exists inside tray assembly 200. For example, vacuum indicator 209 can include a “pop disk” vacuum indicator to allow the operator to visually verify that the container is vacuum sealed. When the tray assembly 200 is vacuum sealed, vacuum indicator 209 may be “popped closed” to indicate that the tray assembly 200 is under vacuum. Vacuum indicator 209 may be “popped open” when the vacuum is released. For example, an operator may use backup vacuum release to release the vacuum from tray assembly 200. Backup vacuum release can thus provide a method to release the vacuum that requires operator intervention (e.g., should the vacuum port valves fail). The vacuum can be released under any variety of methods, including release via the vacuum ports 208*a* and 208*b*. These examples of tray assembly 200 shown in FIG. 4 are of course non-limiting and the technology described herein envisions any variety of modifications to achieve the described features.

It should be appreciated that certain terms throughout this disclosure may be considered in their broadest sense and such terms may be interchangeable. For example, the term “freeze-drying” can include other methods such as freeze-drying, foam drying, vacuum drying, or other related drying methodology. The term “tray” or “container” can also be considered interchangeable and the term “tray” does not limit the configuration of the “container.” The term “product” or “material” can include, but is not limited to, liquids, powders, devices, reagents, drug substances, diagnostic kits, microbiome material, medical devices, and any manner of item or material that will be placed in a container that will be stored and processed using freeze-drying.

As discussed herein, the tray assembly (e.g., tray assembly 100/200) includes various design features and advantages. In particular, the tray assembly includes a sealable lid that provides advantages outside of a freeze-dryer and inside of a freeze-dryer. For outside a freeze-dryer using a vacuum method, a valve is provided to connect to a vacuum source enabling the closed lid to be sealed by vacuum. With the lid installed, pressure inside the tray is reduced with a pump through the vacuum/release valve located on the tray. The pressure differential between the inside of the tray and atmosphere will maintain the seal.

A mechanical latch or fastener can be added to ensure no loss of seal, and the tray can now be stored or loaded into the freeze dryer. Using mechanical means, latches can be used to hold the lid in place, and mechanical fasteners such as quarter turn fasteners can be used. Clamps, or other types of devices can be used, and the tray assembly is configured for long term storage. It should be appreciated that both vacuum and mechanical means can be used.

As for application inside the freeze-dryer, after drying is complete (and with the freeze-dryer under a light vacuum), the tray lid can be pressed onto the tray seal utilizing the shelf closure system. The vacuum in the product chamber is then released into atmosphere, while the lid is held in place. The pressure differential between the vacuum inside the tray and atmosphere keeps the lid sealed. As an additional step, the gas inside the tray can be backfilled with inert gas prior to closure, and by sealing the lid, aseptic transfer and storage is enabled. A mechanical latch that can be engaged and disengaged using the moving shelves may also be included to keep the lid in place.

The technology described herein also envisions multiple methods of filling the tray in either uncontrolled environments and/or controlled environments (such as in a hood, isolator, clean room, or other controlled environment). Methods of adding products or devices include, but are not limited to: pouring product into the lidless tray and then adding the lid and seal, pumping product into the partially lidded tray using a pump and tubing (a valve can be included on the tray to enable filling with the lid on), and/or pulling the liquid product into the tray using vacuum. As for pulling the liquid product into the tray using a vacuum, a vacuum can be placed on one valve reducing the pressure inside the tray. Product is attached to a second valve via a tube and the material is drawn into the tray. When complete, the product fill tube is closed and a slight vacuum, with or without inert gas, is pulled on the tray for storage. The tray assembly may also have an ability to backfill the atmosphere in the tray with inert gas. The tray can thus include storage under mechanical seal, under vacuum seal with or without inert gas, and the atmosphere in the tray can be removed and replaced with an inert gas.

The tray lid can be released inside the sealed freeze-dryer either in the freezing or primary drying steps. After placing the tray on to the freeze-dryer shelf, the pressure in the freeze-dryer chamber is lowered to a point below the vacuum level in the tray, the lid will automatically open and becomes available for processing (e.g., using vacuum differential). A mechanical method allows for a mechanically activated latch to be included to enable the lid to be opened and closed using the moving shelf system. It should be appreciated that the system can include a combination of vacuum and mechanical releases.

It should be appreciated that the lid material can be transparent or opaque, and the tray can be made of metal, plastic, and/or another suitable material. The tray bottom can be designed flat for best shelf surface contact. In an example embodiment, a flexible membrane bottom may be supplied for superior shelf contact. The tray can also be sterilized between uses. Certain sterilizations methods may include steam, vaporized hydrogen peroxide, ethylene oxide sterilization (ETO), as well as other acceptable methods.

A backup vacuum release can be included to overcome failure of the vacuum check valve, and a removable and/or replaceable filter membrane can be incorporated to prevent particle loss while enabling the freeze-drying process to occur. The filter can either cover the entire product surface or can be mounted on the perimeter of the tray in the gap between the lid and tray.

Sensors can be built into the container/tray to enable in-process monitoring and control. Some example sensors may include temperature sensor(s), pressure sensor(s), and/or heat flux sensor(s). The system may include any sensor that is relevant to process monitoring, critical process parameter determination, and control of the freeze-drying process. A vacuum indicator on the lid or tray consisting of a deforming disk that will invert under vacuum for easy visual inspection can also be included. As an option, features such as the ports and valves, vacuum indicator, and vacuum release can also be placed on the lid of the tray assembly.

It should be appreciated that tray assembly 100/200 described herein may be used in an environment utilizing aseptic processing. Various example methods of use that enable aseptic processing are described in the table below:

| Process Step | Pour or Place Product into Tray | Pump Liquid Product into Tray | Pull Liquid Product into the Tray |
|---|---|---|---|
| Filling | Filling takes place in a hood or isolator or other device to maintain sterility, contamination control, and eliminate operator exposure.<br>Without the lid in place . . .<br>Liquid product is poured into the tray in a measured manner in a hood or other atmospherically controlled environment to prevent operator exposure.<br>Or, Non-liquid materials are placed into the trays.<br>After adding product, the lid is placed onto the lid lift mechanism on the tray/container. | Filling takes place in a hood or isolator or other device to maintain sterility, contamination control, and eliminate operator exposure.<br>A metered pump or other measured method is us to add product to the tray/container through a fill valve installed on the tray. This allows product to be added in a clean repeatable process. Product may be added without the lid in place or with the lid placed on the lid lifting mechanism.<br>If the lid is not already in place after adding product, the lid is placed onto the lid lift mechanism on the tray/container. | With the lid in place and pressed on the gasket to create a seal, a negative pressure is placed on the container and the liquid is pulled into the tray in an aseptic manner. The container remains closed and sealed during the entire process.<br>Two valves are supplied on the tray/container to enable the vacuum to be applied, backfilling with inert gas, and for liquid product to be introduced. One valve is used to attach a vacuum and gas backfill source, the other valve is used to attach the liquid product source.<br>This method enables filling to take place in most effective fully aseptic manner and eliminates operator exposure. |
| Sealing and Backfilling for pre-freeze-drying storage | The lid is pressed into the closed position against the gasket and is then either mechanically engaged or a vacuum is placed on the container to provide a reduced atmosphere seal.<br>Once sealed, the gas in the container can be removed and replaced with inert gas, such as nitrogen or argon.<br>In addition to the reduced pressure seal, a mechanical fastening system is implemented that ensures the seal is maintained for long term storage. | The lid is pressed into the closed position against the gasket and either mechanically engaged or a vacuum is placed on the container to provide a reduced atmosphere.<br>Once sealed, the gas in the container can be removed and replaced with inert gas, such as nitrogen or argon.<br>In addition to the reduced pressure seal, a mechanical fastening system is implemented that ensures the seal is maintained for long term storage. | The system is already under negative pressure and will remain sealed.<br>Once sealed, the gas in the container can be removed and replaced with inert gas, such as nitrogen or argon.<br>In addition to the reduced pressure seal, a mechanical fastening system may be implemented for long term storage. |
| | A vacuum indicator, such as a domed disc that 'dimples' or inverts when under vacuum enables a simple method for the operator to determine tray seal integrity when a low pressure seal is required. | | |
| Storage Pre-Freeze-Drying | Once the container is sealed it can be used for long term storage. Prior to use, the mechanical fastening system can be removed, and the tray is ready for use.<br>During the storage period, if the vacuum is lost in the tray, as identified by observing the vacuum disk, then a vacuum and/or inert atmosphere can be restored using the valving system included in the tray. | | |
| Loading into Freeze-Dryer and Releasing the Lid | Remove mechanical closure devices and/or fasteners, if any, prior to placing in the freeze-dryer. One of the following methods may be implemented.<br>No vacuum or mechanical seal - Containers that are not vacuum sealed will be open and ready for freeze-drying and may be placed in the freeze-dryer.<br>Mechanically sealed - After placing in the freeze-dryer, containers that are fastened using latches or 'push to close, push to open' system, other mechanical method, will remain sealed and will be opened using the movement of the stoppering shelf system in the freeze dryer during the freeze-drying process. This enables aseptic processing, eliminates operator exposure, and eliminates the potential for cross contamination.<br>Vacuum sealed- If the containers are vacuum sealed, the container after being placed in the freeze-dryer will open during the freeze-drying cycle when the vacuum in the product chamber is reduced to a level below that of the container. During the freeze-drying cycle, the lid can be released either before or during the freezing process or just prior to the beginning of the primary drying cycle.<br>Mechanical and Vacuum sealed - after placing in the freeze-dryer, containers with both types of seal will be automatically opened using a combination of pressure release and mechanical release. | | |

-continued

| Process Step | Pour or Place Product into Tray | Pump Liquid Product into Tray | Pull Liquid Product into the Tray |
|---|---|---|---|
| Freezing | Freezing in trays is accomplished through contact between the bottom of the tray and the shelf. The described design, when the lid remains closed through the freezing process, enables freezing with the shelf stack collapsed where both the bottom of the tray and top of the lid are in contact with temperature-controlled surfaces. This enables better control of the freezing process. | | |
| Post-Freeze-Drying | During primary and secondary drying, the lid on the tray/container will be open. After the process is complete the lid will be resealed to the tray prior to opening the freeze-dryer. Resealing the lid prior to opening the freeze-dryer enables aseptic processing, eliminates operator exposure, and eliminates the potential for cross contamination and other degradation.<br>Once freeze-drying is complete one of the following methods for sealing the lid is used:<br>Mechanical - If containers are fastened using 'push to close, push to open' or other mechanical system, then the shelf system in the freeze dryer will be used to press the top down to reengage the lid to the closed position.<br>Vacuum - If the containers are to be vacuum sealed, the lid will be pressed into place using the stoppering feature of the freeze-dryer. Prior to sealing the option to backfill with inert gas may take place for applications where storage in an anerobic environment is required. Once the desired level of pressure to be maintained in the tray and gas composition is reached, the lid is closed and held closed by the shelf assembly until the vacuum in the product chamber is completely released to atmospheric pressure. The tray will have a negative pressure inside, keeping the lid sealed.<br>Mechanical and Vacuum sealed - before removing the trays from the freeze-dryer, containers with both types of seal will be automatically sealed using a combination of pressure differential and mechanical sealing.<br>Once the trays are removed from the product chamber mechanical closure devices and/or fasteners, if any, can be added for long term storage. | | |
| | A vacuum indicator, such as a domed disc that 'dimples' or inverts when under vacuum enables a simple method for the operator to determine tray seal integrity when a low-pressure seal is required. | | |

It should be appreciated that the technology described in this document includes many advantages and the advantages mentioned above are non-exhaustive; additionally, it should also be appreciated that while some advantages or combinations of advantages may be present in some embodiments, some advantages or combinations of advantages may not be present in other embodiments; and the advantages of particular embodiments, including those described above, should not be construed as limiting other embodiments or the Claims.

In the examples described herein, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific described details. In other instances, detailed descriptions of well-known methods, devices, techniques, etc. are omitted so as not to obscure the description with unnecessary detail.

While the technology has been described in connection with what is presently considered to be the most practical and preferred embodiment, it is to be understood that the technology is not to be limited to the disclosed embodiment, but on the contrary, is intended to cover various modifications and equivalent arrangements.

At least the following is claimed:

1. A bulk sealable tray for filling or loading of product, the bulk sealable tray comprising:

a container having a shape for containing product;

a seal configured for sealing the bulk sealable tray; and a lid configured to seal the tray via coupling with the seal and the container, wherein the container includes:

a vacuum port configured to introduce a vacuum for the bulk sealable tray;

a fill port configured to fill the container with product;

a vacuum indicator configured to indicate that the bulk sealable tray is vacuum sealed; and a vacuum release located on a surface of the container, wherein the vacuum release is configured to release the vacuum for the bulk sealable tray, the bulk sealable tray is configured for sealing by pressing together the container, the seal, and the lid and creating the vacuum using the vacuum port thereby causing the container, the seal, and the lid to seal the bulk sealable tray, upon sealing the bulk sealable tray, the bulk sealable tray is configured for placement in a freeze drying apparatus, and upon being placed in the freeze drying apparatus, the container is configured to open when the vacuum is reduced to a vacuum level below that of the container.

2. The bulk sealable tray of claim 1, further comprising:

a filter configured for placement between the container and the lid for preventing particulate loss.

3. The bulk sealable tray of claim 1, further comprising:

one or more fasteners configured to maintain sealing of the bulk sealable tray by fastening the lid to the container.

4. The bulk sealable tray of claim 1, further comprising:

a mechanical latch configured to latch the container to the lid, wherein the bulk sealable tray is sealable via the mechanical latch.

5. The bulk sealable tray of claim 1, wherein the seal is configured for integration with the lid and/or the container.

6. The bulk sealable tray of claim 1, wherein the lid is composed of a material including any of glass, metal, or plastic.

7. The bulk sealable tray of claim 1, wherein the container includes one or more device holders configured to allow one or more devices to stay in place within the container.

8. The bulk sealable tray of claim 1, further comprising a fill port configured to fill the container with product.

9. The bulk sealable tray of claim 1, wherein the bulk sealable tray is further configured to be placed in storage, or to be placed in storage and later placed in the freeze drying apparatus.

10. The bulk sealable tray of claim 1, wherein the container further comprises a lid lifting mechanism configured to, at least, enable opening of the bulk sealable tray.

11. A sealable tray, comprising:
a container having a shape for containing product;
a seal;
a lid configured to seal the tray via coupling with the seal and the container; and
a filter configured for placement between the container and the lid for preventing particulate loss, wherein
the container includes:
a port configured to, at least, introduce a vacuum for the sealable tray; and
a vacuum release located on a surface of the container, wherein the vacuum release is configured to release the vacuum for the sealable tray,
the sealable tray is configured for sealing by pressing together the container, the seal, and the lid and creating the vacuum using the port thereby causing the container, the seal, and the lid to couple together to seal the sealable tray,
upon sealing the sealable tray, the sealable tray is configured for placement in a freeze drying apparatus, and
upon being placed in the freeze drying apparatus, the container is configured to open when the vacuum is reduced to a vacuum level below that of the container.

12. The sealable tray of claim 11, further comprising:
one or more fasteners configured to maintain sealing of the sealable tray by fastening the lid to the container.

13. The sealable tray of claim 11, wherein the shape of the container is an elongated rectangle shape.

14. The sealable tray of claim 11, wherein the shape of the container is a circular or oval shape.

15. A sealable tray, comprising:
a container having a shape for containing product;
a seal;
a lid configured to seal the tray via coupling with the seal and the container; and
a filter configured for placement between the container and the lid for preventing particulate loss, wherein
the container includes:
a port configured to, at least, introduce a vacuum for the sealable tray; and
a mechanical latch,
the sealable tray is configured for sealing by coupling together the container, the seal, and the lid and maintaining a sealed state of the sealable tray using the mechanical latch,
upon sealing the sealable tray, the sealable tray is configured for placement in a freeze drying apparatus, and
upon being placed in the freeze drying apparatus, the container is configured to open when the mechanical latch is operated.

16. The sealable tray of claim 15, further comprising:
one or more fasteners configured to maintain sealing of the sealable tray by fastening the lid to the container.

17. The sealable tray of claim 15, wherein the seal is configured for integration with the lid.

18. The sealable tray of claim 15, wherein the seal is configured for integration with the container.

* * * * *